United States Patent [19]

Gullett

[11] 4,378,668
[45] Apr. 5, 1983

[54] LAWNMOWER-EDGE TRIMMER

[76] Inventor: Brad Gullett, 376 Hidden Pines Cir., Casselberry, Fla. 32707

[21] Appl. No.: 264,678

[22] Filed: May 18, 1981

Related U.S. Application Data

[63] Continuation-in-part of Ser. No. 76,146, Sep. 17, 1979, abandoned.

[51] Int. Cl.³ ............................................. A01D 46/00
[52] U.S. Cl. ..................................... 56/12.7; 56/255; 56/295; 56/17.4
[58] Field of Search ............... 56/295, 12.7, 255, 16.7, 56/17.2, 17.4, 17.5; 30/276, 347

[56] References Cited

U.S. PATENT DOCUMENTS

| | | | |
|---|---|---|---|
| 2,511,124 | 6/1950 | Phelps | 56/17.4 |
| 2,578,880 | 12/1951 | Doyle | 56/320 |
| 2,898,723 | 8/1959 | Goodall | 56/17.5 |
| 3,715,875 | 2/1973 | Brucker | 56/17.4 |
| 3,916,607 | 11/1975 | Howard | 56/295 |
| 4,086,700 | 5/1978 | Inada | 30/276 |
| 4,282,653 | 8/1981 | Comer | 56/12.7 |

FOREIGN PATENT DOCUMENTS 197806  6/1978  United Kingdom ................. 56/17.2

Primary Examiner—Robert A. Hafer
Attorney, Agent, or Firm—Abe Hatcher

[57] ABSTRACT

A lawn mower having a plurality of rotors with whip rotary blades arranged under a housing around a shaft, each having a guard over it adapted to be pulled up so that the whip blade can trim edges around trees and next to buildings.

13 Claims, 7 Drawing Figures

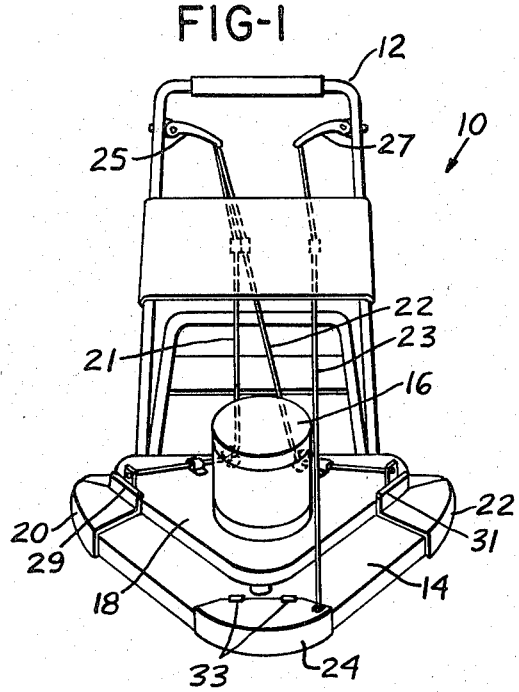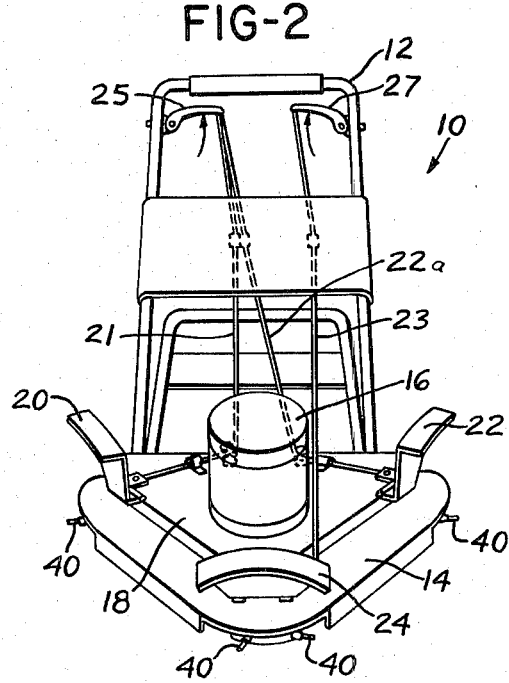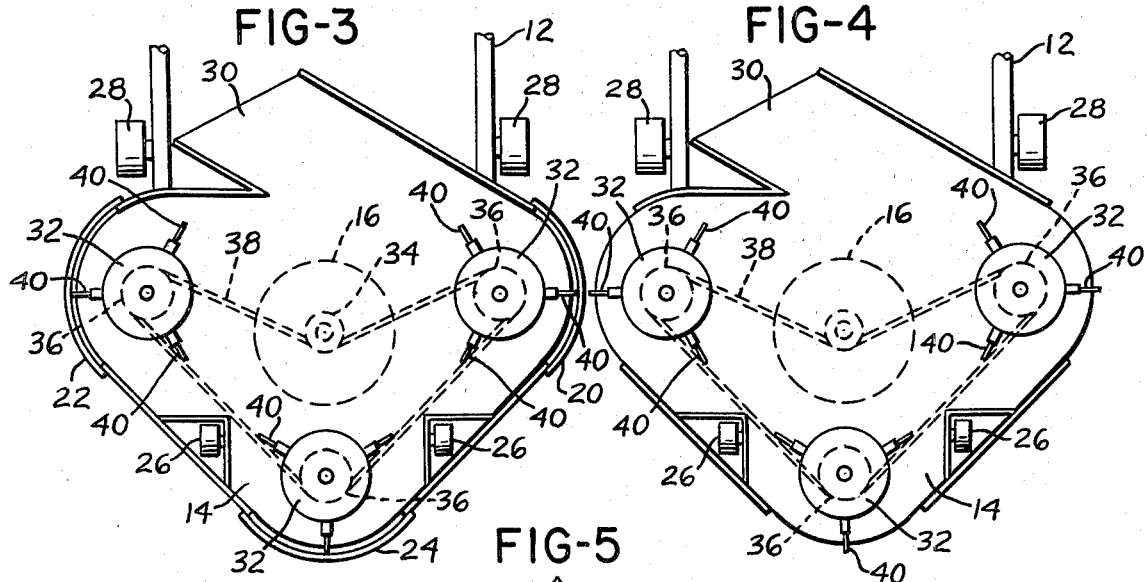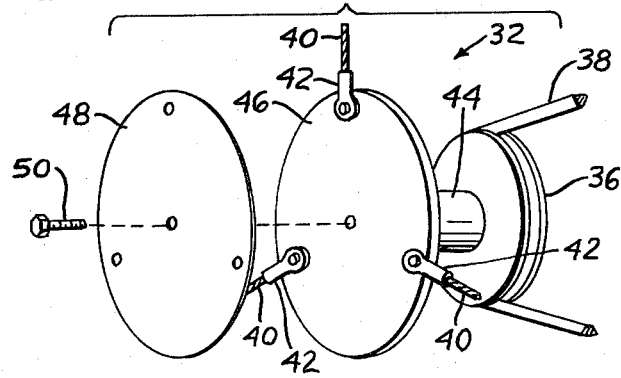

LAWNMOWER-EDGE TRIMMER

CROSS-REFERENCE TO RELATED APPLICATION

This is a continuation-in-part of Ser. No. 76,146, filed Sept. 17, 1979, now abandoned.

FIELD OF THE INVENTION

This invention relates to grass and weed-cutting apparatus. More particularly, it relates to a lawnmower having whip rotors adapted to do close-up trimming, and a kit comprising the parts necessary to put such a lawn mower together.

DESCRIPTION OF THE PRIOR ART

Edge trimmers having conventional blades and provided with swing-away guard plates are depicted in U.S. Pat. No. 3,807,151 and well known. So are rotating-shaft or rotating disc conventional rotary blade mowers such as those of U.S. Pat. No. 4,107,907, which employs hinged guards, and of U.S. Pat. No. 3,916,607, which employs tine teeth for raking, as well as mowers having a plurality of rotating flexible synthetic resin cutting members or wires such as those depicted in U.S. Pat. No. 4,086,700, nylon filamentary cutters or plastic pins with flexible tips such as those shown in U.S. Pat. No. 4,065,913, and spools wrapped with filament-type cutting strands such as those of U.S. Pat. No. 4,189,905. U.S. Pat. No. 3,916,606 shows a farm mower which uses a single belt to drive a large main central rotary blade extending into the apex of a triangle and two smaller blades, also rotary, one on each side and slightly to the rear of the main blade. However, none of the aforesaid patents provides a solution to the problem which a homeowner has when he needs a single safe mower which will trim edges close to the wall of a building or close to a tree in addition to mowing the rest of his lawn.

SUMMARY OF THE INVENTION

After extended investigation I have found that by providing a rotary lawnmower with a plurality of rotary whip blade elements, preferably three, arranged peripherally underneath a housing and operated by a single belt going partially around a central rotary shaft pulley for each of said elements, said housing having in association therewith a retractable whip blade guard for each whip blade element, I enable a rotary lawnmower to become an edge trimmer which may be used to do a substantially better overall job of mowing a yard than either an edge trimmer or a rotary mower can do by itself. According to my invention each rotary whip blade element preferably has a plurality of whip blades, preferably three. By whip blade I mean a flexible cutting member, my preference being one having a multistranded wire core coated with synthetic resin, preferably nylon. Each whip blade is inserted into an eye mount. According to my invention I employ a central rotor or rotating shaft pulley with a pulley belt extending part-way around it and part-way around each of whip blade elements or cutter rotors so that a single belt may be used to rotate all of the whip blades on all of the whip blade elements or rotors, there being preferably three whip blades for each whip blade element equidistant apart. According to my invention the mower-trimmer may be assembled from a kit containing the separate parts which make it up when put together, specifically, a housing with a guard extending peripherally around the lower part thereof except for intermittent interruptions or spaces for attachment of the hinged guard elements which have hinges therefor, wheels-supporting means for supporting the housing on front and rear axles for movement of said mower-trimmer, a motor, for example, operated with gasoline fuel, including proper covering or protection therefor as well as means for starting and controlling same, a pushing handle, cables or the like connecting the hinged guard elements with one or more lever arms on the handle for retracting them or pulling them up for close trimming, a plurality of whip blade elements, a pulley for rotation of each whip blade element, each of said whip blade elements made up of a plurality of whip blades, preferably three, means for attaching the whip blades, preferably eye-hook mounts, mounting eye discs for mounting of the whip blades thereon via said eye-hook mounts, a Flex-Steel or spring steel cover or snap disc for snapping on and holding the eye-hook mounts in position on the pulley and means such as nuts, bolts, washers, screws and the like for holding the aforesaid parts of the whip blade elements together on the pulley and a belt for fitting around the central rotating pulley or rotor and the plurality of surrounding whip blade elements.

DESCRIPTION OF THE DRAWING AND OF THE PREFERRED EMBODIMENT

For a better understanding of my invention, reference will now be made to the drawing which forms a part hereof and which represents the preferred embodiment of the invention and is illustrative thereof.

In the drawing,

FIG. 1 is a front perspective view of a representative lawnmower-edge trimmer according to the invention with whip guards in a down position.

FIG. 2 is a front representative view of the lawnmower-edge trimmer of FIG. 1 with whip guards in an up position.

FIG. 3 is a bottom view of the mower-edge trimmer of FIG. 1 with guards down so that a pulley drive mechanism is seen.

FIG. 4 is a bottom view of the lawnmower-edge trimmer of FIG. 3 except that the whip guards are shown in the up position.

FIG. 5 is an exploded perspective view of the whip blade unit assembly or whip blade element of a mower such as that of FIG. 1.

Figure 6:
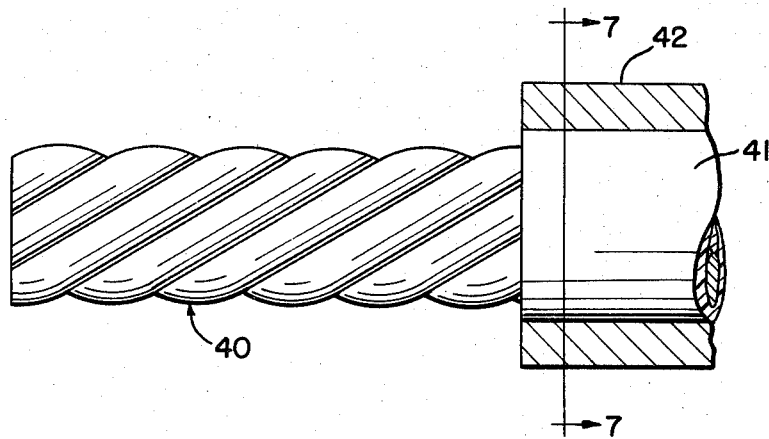
FIG. 6 is an enlarged view from one side of a whip blade with mounting means useful according to the invention.
Figure 7:
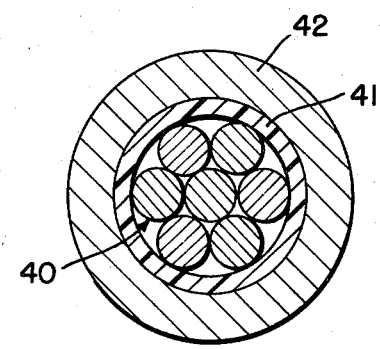
FIG. 7 is a cross-section of the whip blade with mounting means of FIG. 6.

In FIGS. 1-4 of the drawing, mower-trimmer assembly 10 includes generally a handle 12, housing 14, motor 16, pulley guard 18, whip guards 20,22 and 24, front and rear wheels 26, 28, discharge chute 30, cutter trimmer rotor assemblies 32, motor or central rotating shaft pulley 34, whip blade or cutter rotors or pulleys 36, pulley belt 38 and whip or cutter wires 40. The whip or cutter guards 20, 22 and 24 are raised and lowered by means of flexible cables 21, 22a and 23, levers 25 and 27 on handle 12 and hinges 29, 31 and 33. The whip blades of the whip blade unit of FIG. 5 comprise a cutter wire or whip mounted or inserted by a conventional eye-hook in flexible steel or like cutter or whip eye mounts 42, a spring steel cover snapping on and holding the eye-hook in position. Additional components of the whip blade unit of FIG. 5 include pulley shaft 44, whip or cutter mounting eye disc 46, cover or snap disc 48 for holding mount 42 on wire whip 40 and screw 50 for holding snap disc 48 and mounting disc 46 together. The preferred whip blade shown in FIGS. 6 and 7 is made up basically of a whip or wire core 40, preferably of multiple stranding, having a synthetic resin coating 41, such as nylon, which has a sharp cutting edge when the whip blade or cutter rotors or pulleys 36 are turned rapidly. Mounting means 42 are also shown.

While the invention has been described in terms of preferred embodiments, the claims appended hereto are intended to encompass all embodiments which fall within the spirit of the invention.

Having thus described my invention and certain preferred embodiments thereof, I claim:

1. Apparatus for mowing a lawn and trimming edges comprising, in combination, a wheel-supported central rotary pulley-type mower having a housing with a guard extending around the lower part thereof and wheel-supporting means supporting said housing on front and rear axles for movement of said mower, said guard having a plurality of gaps therein, retractable guard elements for covering said gaps, means for retracting said guard element, a handle for guiding said apparatus, a central rotary shaft pulley rotatably supported within said housing, means for rotating said pulley, a plurality of whip blade elements arranged peripherally underneath said housing each in the vicinity of one of said gaps and each having at least one whip blade, and belt means for turning said whip blade elements.

2. The apparatus of claim 1 wherein said belt means for turning said pulley and whip blade elements comprises a single belt.

3. The apparatus of claim 1 wherein said at least one whip blade comprises a plurality of whip blades.

4. The apparatus of claim 3 wherein each of said plurality of whip blades is mountd on a rotating pulley element.

5. The apparatus of claim 4 wherein each of said plurality of whip blades is mounted on said rotating pulley element by means of an eye hook fastened to a mounting disc which has a cover plate thereover to hold it in place on said rotating pulley element.

6. The apparatus of claim 5 wherein said at least one whip blade comprises three.

7. The apparatus of claim 1 wherein said at least one whip blade comprises a multistranded wire core coated with synthetic resin.

8. The apparatus of claim 7 wherein said synthetic resin comprises nylon.

9. In a kit, an assembly of mower components, said assembly of mower components adapted for assembly together as a lawnmower-edge trimmer and said components comprising as cooperating parts thereof a mower housing with a guard having gaps therein extending around the lower part of said guard, a central rotary shaft pulley, a plurality of rotary whip blade elements adapted to be arranged around said central rotary shaft pulley in the vicinity of said gaps, a belt adapted to rotate said central rotary shaft pulley and said plurality of whip blade elements, retractable guards adapted to be fastened over said gaps, axled wheels for moving said lawnmower-edge trimmer when said components are assembled together, a handle for pushing said lawnmower-edge trimmer, means for primarily turning said central shaft and secondarily said whip blade elements via said belt and means for retracting said retractable guards.

10. The assembly of mower components of claim 9 wherein said means for turning comprise a motor, said means for retracting said retractable guards comprise at least one linkage to said handle and at least one lever arm on said handle for retracting said guards and said rotary whip blade elements comprise at least one whip blade and, for each whip blade an eye hook mount for mounting each whip blade on a mounting disc, a mounting disc for each whip blade, a cover disc adapted to fit over each mounting disc, and a rotatable pulley adapted for said belt to fit partially therearound.

11. The assembly of mower components of claim 10 wherein said plurality of whip blade elements comprises three, said at least one whip blade comprises a plurality of whip blades and each whip blade comprises a multistranded wire core coated with synthetic resin.

12. The assembly of mower components of claim 11 wherein said plurality of whip blades comprises three for each whip blade element.

13. The assembly of mower components of claim 12 wherein said synthetic resin comprises nylon.

* * * * *